US006010830A

United States Patent [19]

Choi et al.

[11] Patent Number: 6,010,830

[45] Date of Patent: Jan. 4, 2000

[54] METHOD FOR FORMING BARRIER RIB OF PLASMA DISPLAY PANEL

[75] Inventors: Hyun Mook Choi; Dae Joong Yoon, both of Ich'on, Rep. of Korea

[73] Assignee: Hyundai Electronics Industries Co., Ltd., Kyoungki-do, Rep. of Korea

[21] Appl. No.: 09/104,102

[22] Filed: Jun. 24, 1998

[30] Foreign Application Priority Data

Jun. 25, 1997 [KR] Rep. of Korea ...................... 97-27405

[51] Int. Cl.[7] ................................ G03C 5/00; G02F 1/00

[52] U.S. Cl. .......................... 430/320; 430/311; 430/315; 430/319

[58] Field of Search ......................... 101/128.4; 430/311, 430/315, 319, 320, 324

[56] References Cited

U.S. PATENT DOCUMENTS 5,037,723 8/1991 Hwang .................................... 430/320
5,116,271 5/1992 Arimoto .................................... 445/24
5,352,478 10/1994 Miyake et al. ............................ 427/68
5,674,634 10/1997 Wang et al. ............................ 428/688
5,723,945 3/1998 Schermerhorn ......................... 313/581

FOREIGN PATENT DOCUMENTS 90-5523 4/1990 Rep. of Korea .

*Primary Examiner*—Sharon Gibson
*Assistant Examiner*—Jill N. Holloman
*Attorney, Agent, or Firm*—Selitto & Associates

[57] ABSTRACT

Disclosed is a method for forming a barrier rib of plasma display panel. The method includes the steps of: providing a transparent substrate on which address electrodes having a first thickness are arranged in parallel with each other, a first distance apart from each other; forming a photosensitive paste film on the substrate including the address electrodes; patterning the photosensitive paste film to form a first barrier rib having a second thickness and a first width, wherein the barrier rib is displaced between two adjacent address electrodes; printing a second barrier rib on the first barrier rib by screen printing method; and plasticizing both of the first and second barrier ribs.

5 Claims, 4 Drawing Sheets

METHOD FOR FORMING BARRIER RIB OF PLASMA DISPLAY PANEL

BACKGROUND OF THE INVENTION

The present invention generally relates to a method for forming a plasma display panel, and more particularly, to a method for forming a barrier rib sandwiched between a pair of substrates, for defining an independent discharge area and preventing crosstalks between the discharge areas.

Generally, plasma display panel(hereinbelow referred to as "PDP") as a kind of flat panel display, includes a multiplicity of discharge cells capable of discharging independently. PDP displays pictures on a screen by independently discharging each discharge cells according to the applied external electric signals.

PDP generally includes a pair of transparent substrates opposite to each other, that is, a front substrate and a rear substrate. Barrier ribs are sandwitched between the substrates, to define independent discharge spaces which are referred to as pixels or cells and to prevent crosstalks between adjacent pixels. Interval between the two substrates, that is, thickness of the barrier rib is defined within 10 cm. Thus, PDP has advantages of lightness in weight and thinness in thickness compared with cathod ray tube using electron gun. Also, it is proper to large sized screen compared with liquid crystal displays and has a further advantage that manufacturing method thereof is simple compared with liqud crystal display.

FIG. 1 shows a conventional PDP driven by alternate current(hereinbelow referred to as "AC PDP". A pair of first(or front) and second(or rear) substrates 5 and 1 are arranged such that their inner surfaces are confronted by each other. Address electrodes 2 are arranged parallel to each other on the rear substrate 1 in a first direction. Barrier ribs 3 are respectively disposed between adjacent address electrodes 2 on the rear substrate 1, thereby defining a discharge space. So as to display color picture on the front substrate 5, fluorescent materials 4 selected from red, blue or green, are respectively coated on the rear substrate including inner surfaces of the barrier rib 3 within the discharge spaces. A transparent electrode 6 is arranged orthogonal to the first direction on the front substrate 5. On the front substrate 5 including the transparent electrode 6 are stacked dielectric layer 7 and protecting layer 8 in that order.

FIG. 2 shows barrier ribs formed on the rear substrate 11 by the conventional screen printing method. According to the conventional screen printing method, the barrier ribs 13 are formed by repeating a printing step for forming sub-barrier rib and thereby stacking the sub-barrier ribs.

Although the conventional screen printing method is simple, it needs much time because the printing step is repeated 10 times or more. In addition, during repetition of the printing step, paste pattern stacked to high level may be dropped down, and thereby throughput is lowered.

FIG. 3A to FIG. 3B are simplified sectional views showing a process of forming barrier rib according to the conventional photolithography.

Referring to FIG. 3A, an insulating paste film 23 is coated on the substrate 21 including the address electrodes 22. Afterwards, a photosensitive film is coated on the paste film 23 and is then patterned to form mask patterns 24. Here, the photosensitive mask patterns 24 are positioned between the address electrodes 22 as shown in FIG. 3B. Thereafter, exposed portions of the paste film 23 are etched away by sand blaster method as shown in FIG. 3C. Afterwards, the mask pattern 24 is removed to form barrier ribs 25 as shown in FIG. 3D.

Although the conventional photolithography method is performed in a shorter time compared with the screen printing method, it needs a comparatively high fabrication cost compared with the screen printing method and causes damages to the substrate. Further, the method generates PbO gas, which causes environmental pollutions. Furthermore, barrier rib fabricated by the photolithography method has a poor fineness because the sand particles collide with the side wall thereof.

SUMMARY OF THE INVENTION

Therefore, an object of present invention is to provide a method for forming barrier ribs with high fineness in a PDP without applying complex process.

So as to accomplish the above object, there is provided a method for forming a barrier rib of plasma display panel. The method comprises the steps of: providing a transparent substrate on which address electrodes having a first thickness and a first width are arranged in parallel with each other, a first distance apart from each other; forming a photosensitive paste film on the substrate including the address electrodes; patterning the photosensitive paste film to form a first barrier rib having a second thickness and a second width, wherein the barrier rib is displaced between two adjacent address electrodes; printing a second barrier rib on the first barrier rib having a third thickness and a third width by screen printing method; and plasticizing both of the first and second barrier ribs.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DESCRIPTION OF THE PREFERRED EMBODIMENT

Hereinbelow, with reference to the accompanying drawings, preferred embodiment of this invention will be described.

Figure 1:
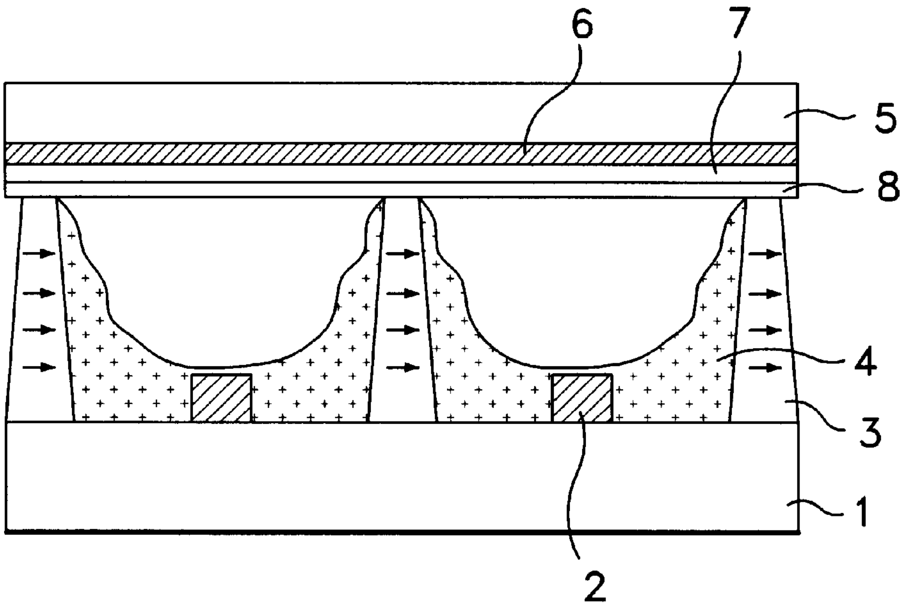
FIG. 1 (PRIOR ART)
FIG. 1 is a simplified section view of a conventional AC plasma display panel.
Figure 2:
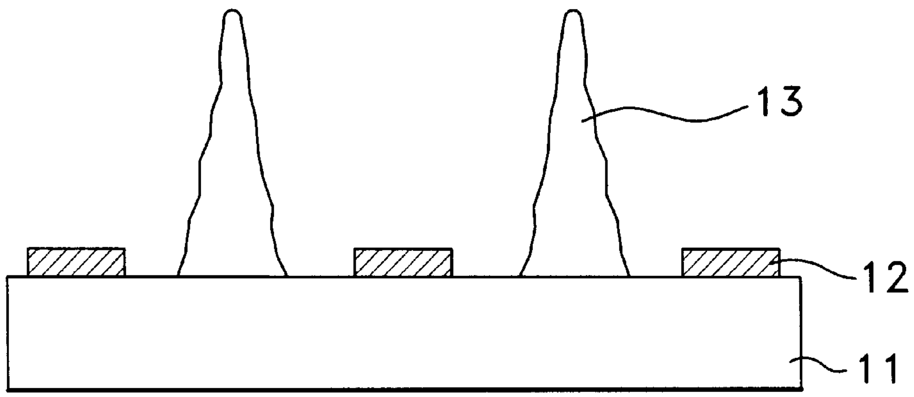
FIG. 2 (PRIOR ART)
FIG. 2 is a simplified section view showing a barrier rib formed by the conventional screen printing method.
Figure 3A:
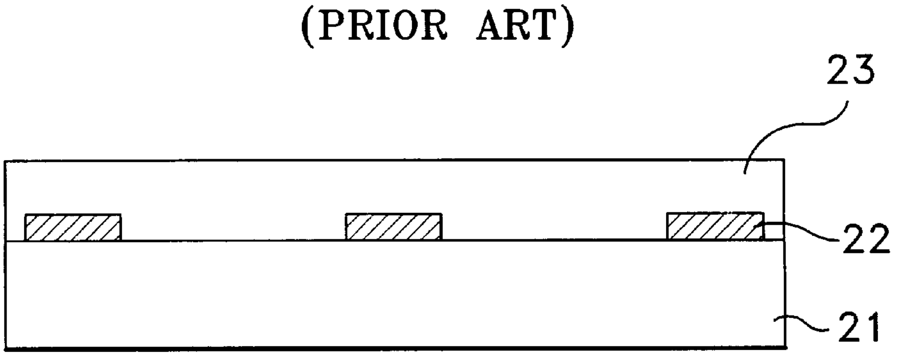
FIG.3A (PRIOR ART)
FIG. 3A to FIG. 3D are simplified sectional views showing a process of forming barrier rib according to a conventional photolithography method.
Figure 3B:
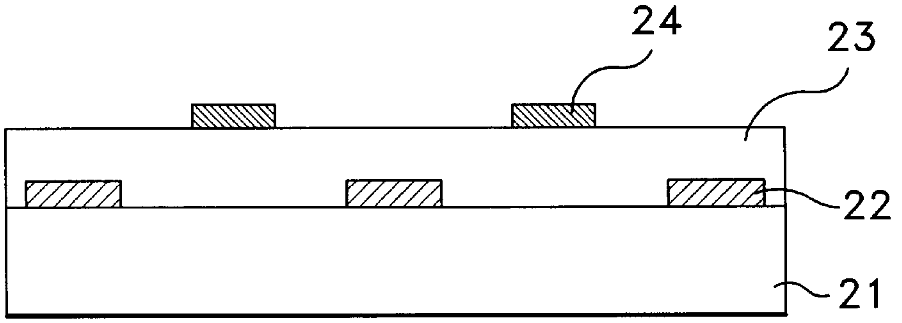
FIG.3B (PRIOR ART)
Figure 3C:
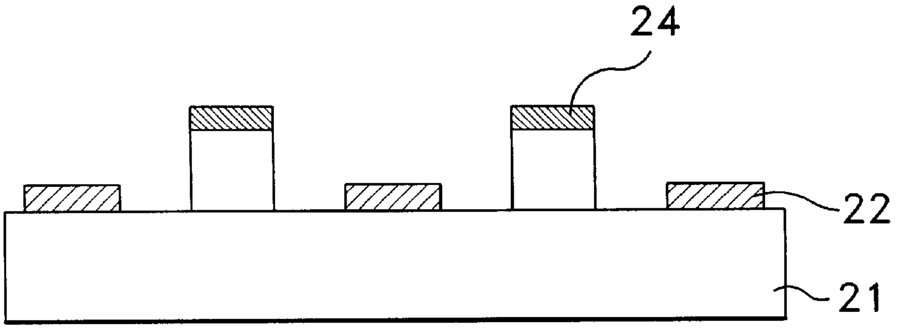
FIG.3C (PRIOR ART)
Figure 3D:
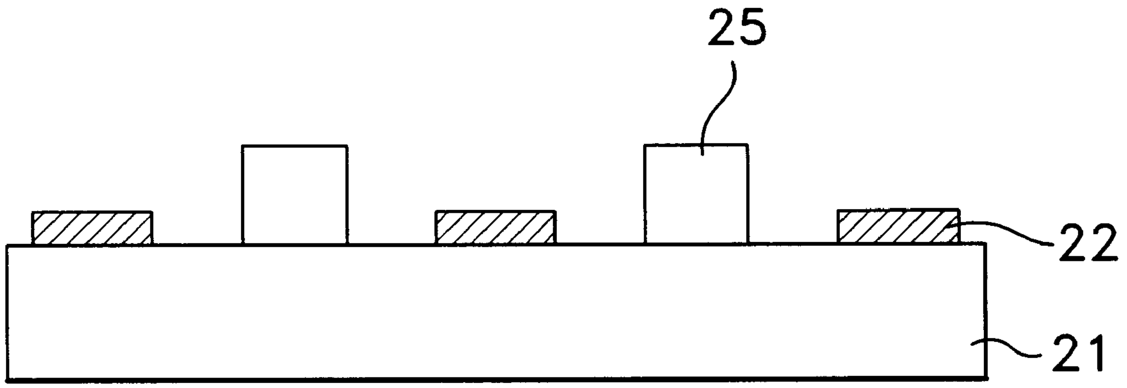
FIG.3D (PRIOR ART)
Figure 4A:
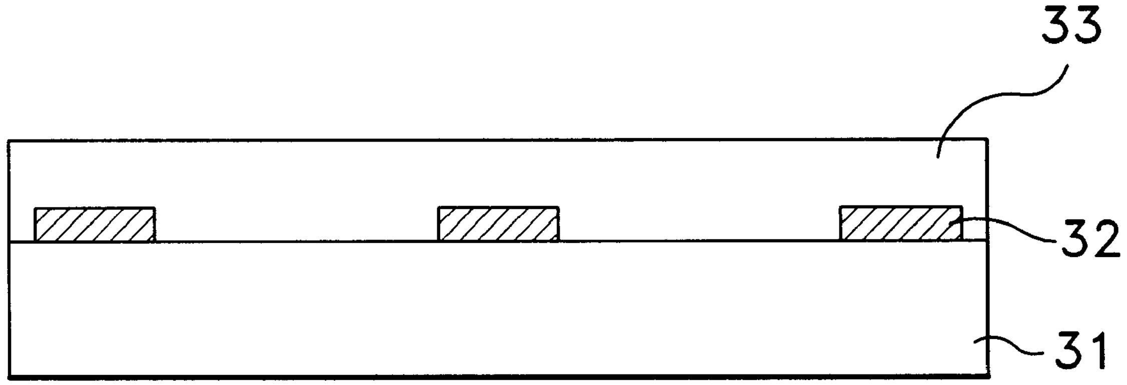
FIG. 4A to FIG. 4C are simplified sectional views showing a process of forming barrier ribs according to embodiments of the present invention.
Figure 4B:
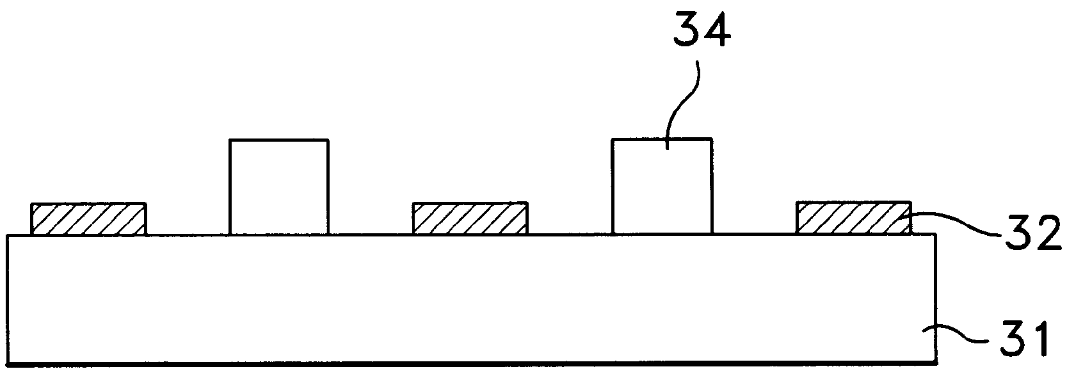
Figure 4C:
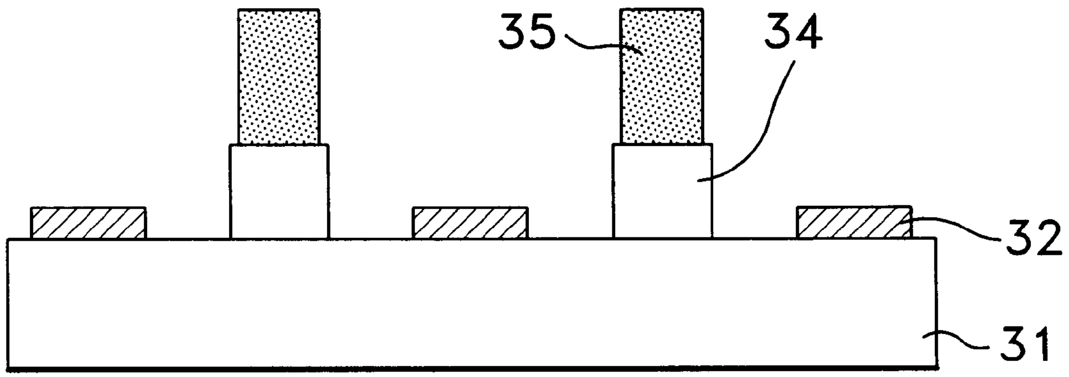

FIG. 4A to FIG. 4C are sectional views showing a process of forming barrier ribs according to the present invention.

Referring to FIG. 4A, a photosensitive paste film 33 is coated on a rear substrate 31 on which address electrodes 32 are formed. Each of the address electrodes 32 has a first thickness and a first width, and is arranged parallel to each other in one direction a first distance apart. Here, the photosensitive paste film 33 is formed to such a thickness that address electrodes 32 are completely covered. A dry resist film may be used instead of the photosensitive paste film 33.

Next, referring to FIG. 4B, the photosensitive paste film 33 is patterned to form a first barrier rib 34 with a second thickness and a second width. In further detail, the first barrier rib 34 is formed by a process comprising the following steps of: coating the photosensitive paste film 33 on the substrate 31 including the address electrodes 32; exposing selected portions of the photosensitive paste film 33 to an ultra violet ray; and developing the exposed portions by an alkaline solution. Here, the second thickness of the first barrier rib 34 is greater than the first thickness of the address electrode 32, so as to easily carry out subsequent process.

Referring to FIG. 4C, a second barrier rib 35 with a third thickness and a third width is printed by the printing method on the surface of the first barrier rib 34. Here, the printing step is carried out multiple times until a desired thickness is obtained. The third width of the second rib 35 is smaller than the second width of the first barrier rib 34 so as to prevent the dropping-down phenomenon which paste pattern stacked to high level may be dropped down.

The first and second barrier ribs are then plasticized after the formation of the first and second barrier ribs. As a result, the barrier rib with high fineness is obtained.

Meanwhile, although the present embodiment shows and describes only the method for forming barrier ribs on the rear substrate, the method can be also applied to a front substrate and the same effects are also obtaned.

Various other modifications will be apparent to and can be made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for forming a barrier rib of plasma display panel comprising the steps of:

providing a transparent substrate on which address electrodes having a first thickness and a first width are arranged in parallel with each other, a first distance apart from each other;

forming a photosensitive paste film on the substrate including the address electrodes;

patterning the photosensitive paste film to form a first barrier rib having a second thickness and a second width, wherein the first barrier rib is displaced between two adjacent address electrodes;

printing a second barrier rib having a third thickness and a third width on the first barrier rib by screen printing method; and plasticizing both of the first and second barrier ribs.

2. The method in claim 1, wherein the photosensitive paste film is a dry-film.

3. The method in claim 1, wherein the patterning step of said photosensitive paste film comprises the steps of:

coating the photosensitive paste film on the substrate including the address electrodes;

exposing selected portions of the photosensitive paste film to a light; and developing the exposed portions by an alkaline solution.

4. The method in claim 1, wherein the first thickness is smaller than the second thickness.

5. The method in claim 1, wherein the second width is greater than the third width.

* * * * *